(12) United States Patent
Lukich et al.

(10) Patent No.: US 6,872,769 B2
(45) Date of Patent: Mar. 29, 2005

(54) TIRE WITH SILICA REINFORCED CARCASS PLY AND/OR CIRCUMFERENTIAL CARCASS BELT OF A NATURAL RUBBER-RICH, SILICA REINFORCEMENT-RICH, RUBBER COMPOSITION

(75) Inventors: Lewis Timothy Lukich, Akron, OH (US); Leonard James Reiter, Norton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 666 days.

(21) Appl. No.: 10/012,125

(22) Filed: Dec. 4, 2001

(65) Prior Publication Data

US 2003/0105212 A1 Jun. 5, 2003

(51) Int. Cl.$^7$ .................................................. C08K 3/34
(52) U.S. Cl. ........................ 524/492; 523/212; 523/216; 524/495
(58) Field of Search ................................ 524/492, 495; 523/212, 216

(56) References Cited

U.S. PATENT DOCUMENTS

| 5,396,940 A | 3/1995 | Segatta et al. ............... 152/209 |
| 5,704,999 A | 1/1998 | Lukich et al. ............ 152/154.2 |
| 6,022,326 A | 2/2000 | Tatum et al. ................ 600/573 |

FOREIGN PATENT DOCUMENTS

| EP | 0900820 | 10/1999 | ............ C08K/3/30 |
| FR | 1316727 | 1/1962 | |
| WO | 0196442 | 12/2001 | ............ C08G/77/26 |

OTHER PUBLICATIONS

European Search Report.

*Primary Examiner*—Edward J. Cain
(74) *Attorney, Agent, or Firm*—Henry C. Young, Jr.

(57) ABSTRACT

The present invention relates to a tire with a carcass ply and/or circumferential carcass belt component comprised of a natural rubber-rich diene-based rubber composition which contains a dispersion of precipitated silica reinforcement, with coupling agent, to a substantial exclusion of carbon black.

17 Claims, No Drawings

US 6,872,769 B2

TIRE WITH SILICA REINFORCED CARCASS PLY AND/OR CIRCUMFERENTIAL CARCASS BELT OF A NATURAL RUBBER-RICH, SILICA REINFORCEMENT-RICH, RUBBER COMPOSITION

FIELD OF THE INVENTION

The present invention relates to a tire with a carcass ply and/or circumferential carcass belt component comprised of a cord reinforced, natural rubber-rich, silica reinforcement-rich, rubber composition. Said natural rubber-rich, diene rubber-based, rubber composition contains a dispersion of synthetic precipitated silica reinforcement, with coupling agent, to the substantial exclusion of carbon black, preferably to the exclusion of carbon black content which will appreciably add reinforcement to natural rubber (e.g. preferably less than 10 phr and preferably less than 6 phr of carbon black which may be added to the rubber composition, for example, as a component of a liquid coupling agent composite for the precipitated silica)

BACKGROUND OF THE INVENTION

Pneumatic rubber tires are conventionally prepared with a rubber tread and an underlying supporting carcass for the tread. The carcass is conventionally composed of one or more rubberized cord reinforced plies. The tire may also contain a circumferential cord reinforced belt positioned between the tread and carcass plies. Such ply and belt construction for a pneumatic tire are well known to those having skill in such art.

Such carcass plies and circumferential belts are historically composed of polymeric or metallic cords (which are continuous in nature and not individual discrete fibers) which are encapsulated with a rubber composition. Such rubber composition is typically reinforced with particulate carbon black and perhaps, in come cases, also a particulate silica.

However, aircraft tires are subject to substantial distortative forces upon associated aircraft landing and taking off procedures where the tire may be required to suddenly accelerate from zero to 200 miles per hour or greater under a significant load.

Accordingly for aircraft tires which may have a carcass composed of from one to 20, or greater, and more conventionally from 4 to 16, carcass plies, each ply being composed of rubber encapsulated cords, the rubber composition is of a special consideration because an aircraft tire represents a relatively large heat sink where heat is generated resulting in a potentially large increase in operating temperature over a relatively short time frame due to expected large loads placed upon the tires during aircraft landings and takeoffs at high speeds in which such tires experience relatively large deflections. Of special concern for such tires are attained and retained physical properties such as low hysteresis (to promote low heat generation during dynamic use of the tire due to relatively large and sudden loads experienced, for example, by aircraft takeoffs and landings), as well as tensile strength.

Thus dissipation of heat from such an aircraft tire under such operating condition is a challenge in order to maintain such physical properties.

Historically, in U.S. Pat. No. 5,396,940 a carcass ply rubber composition is related which is composed of 5 to 95 phr of epoxidized natural rubber, 5 to 85 phr of silica, a silica coupler, carbon black which can be a carbon black such as N299, which can also contain 95 to 5 phr of other rubbers including natural rubber and cis 1,4-polybutadiene rubber. In U.S. Pat. No. 6,022,326, a tire is related which has a carcass ply component having a rubber composition reinforced with carbon black to the exclusion of silica.

In the description of this invention, the term "phr" where used means "parts of material by weight per 100 parts by weight of rubber". The terms "rubber" and "elastomer" are used interchangeably unless otherwise mentioned.

SUMMARY AND PRACTICE OF THE INVENTION

In accordance with this invention a tire, and particularly a tire intended for use as an aircraft tire, is comprised of a circumferential tread and an underlying and supporting carcass for said tread, with a circumferential tread belt positioned between said tread and the crown portion of said carcass, wherein said carcass is comprised of two spaced apart inextensible bead portions and at least one carcass ply, namely from one to about 20, alternately from 2 to 36 and further alternately from 4 to 16, carcass plies, extending through said carcass crown portion and connecting said bead portions, and wherein said tread belt is comprised of at least one belt ply comprised of a plurality of spaced apart, individual continuous cords substantially parallel aligned to each other and substantially axially aligned in the circumferential direction of the tread and where said carcass plies are comprised of spaced apart, individual continuous cords substantially parallel aligned to each other substantially radially aligned in a direction of from one bead portion to the other, wherein said belt and said carcass plies are individually comprised of a multiplicity of cords comprised of at least one synthetic filament and wherein said belt and carcass cords are individually encapsulated with a natural rubber-rich and precipitated silica reinforcement-rich rubber composition, wherein said rubber composition is comprised of, based parts by weight per 100 parts by weight rubber (phr) about 80 to about 100, alternately about 90 to about 100, phr of natural cis 1,4-polyisoprene rubber and from zero to about 20, alternately from zero to about 10, phr of cis 1,4-polybutadiene rubber, wherein said carcass ply rubber composition is comprised of (A) about 30 to about 60 phr of aggregates of precipitated silica and from one to a maximum of 10 phr of rubber reinforcing carbon black, and (B) a coupling agent for said silica having a moiety reactive with hydroxyl groups contained on the surface of said precipitated silica and another moiety interactive with at least one of said rubbers; and wherein said belt ply rubber composition contains (A) about 30 to about 60 phr of carbon black reinforcement and up to about 10 phr of precipitated silica, or (B) about 30 to about 60 phr of aggregates of precipitated silica and from one to a maximum of 10 phr of rubber reinforcing carbon black, and a coupling agent for said silica having a moiety reactive with hydroxyl groups contained on the surface of said precipitated silica and another moiety interactive with at least one of said rubbers.

In practice, the rubber composition for the carcass ply and said belt ply is sometimes referred to as a ply coat.

Cords for said carcass plies and said belt ply are conventionally composed of at least one, and preferably a plurality of twisted, or cabled, filaments of synthetic materials as are, in general, well known to those having skill in such art.

Various cords of filament(s) of synthetic materials may be used for this invention which are preferably composed of at least one synthetic, organic polymeric material selected from nylon, polyester, aramid filaments, as well as carbon fiber, ceramic fiber and boron-based fibers. In practice, said aramid filaments are, in general, considered herein as being more inextensible than polyester filaments and polyester filaments are considered herein as being more inextensible than nylon filaments.

In one aspect of this invention, a combination of carcass ply cords and belt ply cords may be comprised of, individually for example, aramid and aramid filaments respectively (e.g. aramid for the carcass ply and aramid for the belt ply), of nylon and aramid filaments respectively, of aramid and nylon filaments respectively, of nylon and nylon filaments respectively, of aramid and polyester filaments respectively and of polyester and polyester filaments respectively.

Accordingly, the carcass ply and belt ply components of the tire is a cord reinforced element of the tire carcass. One, preferably at least 2, often at least 4, and up to as many as 20 and even up to 36 carcass plies maybe used in the tire carcass for this invention. The carcass ply component itself is conventionally a multiple cord reinforced component where the cords are embedded in a rubber composition which is usually referred to as a ply coat. The ply coat rubber composition is conventionally applied by calendering the rubber onto the multiplicity of cords as they pass over, around and through relatively large, heated, rotating, metal cylindrical rolls. Such carcass ply component of a tire, as well as the calendering method of applying the rubber composition ply coat, are well known to those having skill in such art.

The importance of using a natural rubber-rich, precipitated silica reinforcement-rich, rubber composition to the substantial exclusion of carbon black reinforcement, particularly less than an appreciable reinforcing amount of carbon black, is to endeavor to achieve a low hysteresis physical property for the rubber composition in order to enhance (reduce) the tire's operating temperature under dynamic operating conditions such as relatively heavy and sudden loads due to aircraft landings and takeoffs.

An additional importance of using a major amount of natural rubber for the ply coat is to endeavor to obtain a relatively high tensile strength in combination with a relatively low hysteresis property as well as good processability of the rubber composition during the calendering of the ply coat rubber composition onto the cord reinforcement.

It is desired to use a minor amount of cis 1,4-polybutadiene rubber as an elastomer in the ply coat rubber composition to also contribute to a relatively low hysteresis in combination with resisting aging of various physical properties of the rubber composition.

For the practice of this invention, it is considered herein that the maximum of about 10, and preferably a maximum of about 8, phr for the carbon black content does not constitute an appreciable rubber reinforcement amount of carbon black. Actually the minimal amount of carbon black allowed in the ply rubber composition is as a carrier for a liquid coupling agent so that the very small amount of carbon black is allowed to be a part of the coupling agent composite, where desired.

Also, for the practice of this invention, the ply coats are exclusive of epoxidized natural rubber.

If desired, the ply coat rubber composition may contain up to about 20, alternately about 5 to about 10, phr of medium vinyl polybutadiene rubber having a vinyl 1,2-content in a range of about 40 to about 60 percent vinyl. In general, it is desired that the ply coat rubber composition is preferably exclusive of styrene-butadiene rubber, styrene-isoprene rubber and styrene-isoprene-butadiene rubber, although it may contain from zero to 10 phr thereof.

As hereinbefore discussed, in practice, cords of various compositions may be used for the carcass ply such as, for example, but not intended to be limiting polyester, aramid and nylon as well as carbon, ceramic and boron-based filaments. Such cords and their construction, whether monofilament or as twisted filaments, are, in general, well known to those having skill in such art.

The coupling agent may, for example, be bis-(3-trialkoxyalkylsilane)polysulfide having from 2 to 8, with an average of from 2 to 2.6 or from 3.5 to 4, sulfur atoms in its polysulfidic bridge.

Such additional coupling agent may be, for example, bis-(3-triethoxysilylpropyl)polysulfide having from 2 to 8, with an average of from 2 to 2.6 or from 3.5 to 4, sulfur atoms in its polysulfidic bridge.

The synthetic amorphous silica may be selected from aggregates of precipitated silica, which is intended to include precipitated aluminosilicates as a co-precipitated silica and aluminum.

Such precipitated silica is, in general, well known to those having skill in such art. For example, such precipitated silica may be precipitated by controlled addition of an acid such as, for example, hydrochloric acid or sulfuric acid, to a basic solution (e.g. sodium hydroxide) of a silicate, for example, sodium silicate, usually in the presence of an electrolyte, for example, sodium sulfate. Primary, colloidal silica particles typically form during such process which quickly coalesce to form aggregates of such primary particles and which are then recovered as precipitates by filtering, washing the resulting filter cake with water or an aqueous solution, and drying the recovered precipitated silica. Such method of preparing precipitated silica, and variations thereof, are well known to those having skill in such art.

Alternately, the silica may be pre-treated with an alkoxysilane and/or the coupling agent.

Commonly employed synthetic amorphous silica, or siliceous pigments, used in rubber compounding applications can be used as the silica in this invention, including precipitated siliceous pigments and fumed (pyrogenic) silica wherein aggregates of precipitated silicas are preferred.

The precipitated silica aggregates preferably employed in this invention are precipitated silicas such as, for example, those obtained by the acidification of a soluble silicate, e.g., sodium silicate and may include co-precipitated silica and a minor amount of aluminum.

Such silicas might usually be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The silica may also be typically characterized by having a dibutylphthalate (DBP) absorption value in a range of about 50 to about 400 cm3/100 g, and more usually about 100 to about 300 $cm^3/100$ g.

Various commercially available precipitated silicas may be considered for use in this invention such as, only for example herein, and without limitation, silicas from PPG Industries under the Hi-Sil trademark with designations Hi-Sil 210, Hi-Sil 243, etc; silicas from Rhodia as, for example, Zeosil 1165MP and Zeosil 165GR, silicas from Degussa AG with, for example, designations VN2 and VN3, as well as other grades of silica, particularly precipitated silicas, which can be used for elastomer reinforcement.

It is recognized that conventional compounding ingredients may be used in the preparation of the ply coat rubber composition. The ply coat, in the finished tire is sulfur cured as a component of the tire. For example, the sulfur cured ply coat rubber composition may contain conventional additives including reinforcing agents, fillers, peptizing agents, pigments, stearic acid, accelerators, sulfur vulcanizing agents, antiozonants, antioxidants, processing oils, activators, initiators, plasticizers, waxes, pre-vulcanization inhibitors, extender oils and the like. Representative of conventional accelerators may be, for example, amines, guanidines, thioureas, thiols, thiurams, sulfenamides, dithiocarbamates and xanthates. Representative of sulfur vulcanizing agents include element sulfur (free sulfur) or sulfur donating vulcanizing agents, for example, an amine disulfide, polymeric polysulfide or sulfur olefin adducts. The amount of sulfur vulcanizing agent will vary depending on the type of rubber and particular type of sulfur vulcanizing agent but generally range from about 0.1 phr to about 3 phr with a range of from about 0.5 phr to about 2 phr being preferred. Representative of the antidegradants which may be in the rubber composition include monophenols, bisphenols, thiobisphenols, polyphenols, hydroquinone derivatives, phosphites, phosphate blends, thioesters, naphthylamines, diphenol amines as well as other diaryl amine derivatives, para-phenylene diamines, quinolines and blended amines. Antidegradants are generally used in an amount ranging from about 0.1 phr to about 10 phr with a range of from about 2 to 6 phr being preferred. Representative of a peptizing agent that may be used is pentachlorophenol which may be used in an amount ranging from about 0.1 phr to 0.4 phr with a range of from about 0.2 to 0.3 phr being preferred. Representative of processing oils which may be used in the rubber composition of the present invention include, for example aliphatic, naphthenic and aromatic oils. The processing oils may be used in a conventional amount ranging from about zero to about 30 phr with a range of from about 5 to about 15 phr being more usually preferred. Initiators are generally used in a conventional amount ranging from about 1 to 4 phr with a range of from about 2 to 3 phr being preferred.

Accelerators may be used in a conventional amount. In cases where only a primary accelerator is used, the amounts range, for example, from about 0.5 to about 4 phr. In cases where combinations of two or more accelerators are used, the primary accelerator is generally used, for example, in amounts ranging from 0.5 to 3 phr and a secondary accelerator is used in amounts ranging, for example, from about 0.1 to 1 phr. Combinations of accelerators have been known to produce a synergistic effect. Suitable types of conventional accelerators are amines, disulfides, guanidines, thioureas, thiazoles, thiurams, sulfenamides, dithiocarbamates and xanthates. Preferably, the primary accelerator is a sulfenamide. If a secondary accelerator is used, it is preferably a guanidine, dithiocarbamate or thiuram compound.

Aircraft pneumatic tires are conventionally comprised of a generally toroidal shaped carcass with an outer circumferential tread adapted to the ground contacting space beads and sidewalls extending radially from and connecting said tread to said beads. The tread may be built, shaped, molded and cured by various methods which will be readily apparent to those skilled in the art.

The sulfur cured ply rubber composition of the present invention may be integral with and adhere to various tire carcass substrate rubber compositions.

The practice of this invention is further illustrated by reference to the following examples which are intended to be representative rather than restrictive of the scope of the invention. Unless otherwise indicated, all parts and percentages are by weight.

EXAMPLE

Rubber compositions containing the materials recited in Table 1 were prepared in an internal rubber mixer using two separate stages of addition, namely a non-productive mixing stage for a total of about four minutes to a temperature of about 165° C., followed, after cooling the rubber mixture to below 40° C., by a productive mixing stage for about two minutes to a temperature of about 110° C. where the sulfur and curatives were added. The terms "non-productive" and "productive" as used for mixing stages for mixing rubber compositions are well known to those having skill in such art.

The following Table 1 illustrates the rubber compositions with Sample A representing a control and Sample B representing the invention.

TABLE 1

|  | Control Sample A | Sample B |
|---|---|---|
| Non-productive Mix Stage |  |  |
| Natural rubber[1] | 100 | 100 |
| Carbon black[2] | 40 | 0 |
| Silica[3] | 0 | 42 |
| Coupling agent composite[4] | 0 | 6 |
| Zinc oxide[5] | 7 | 7 |
| Fatty acid[6] | 2 | 2 |
| Reactive resin[7] | 5 | 5 |
| Peptizer[8] | 0.2 | 0.2 |
| Oil[9] | 4 | 5.5 |
| Productive Mix Stage |  |  |
| Accelerator[10] | 1.4 | 2.9 |
| Sulfur[11] | 1.4 | 1.4 |
| Antidegradants[12] | 0.75 | 2 |
| Bismaleimide[13] | 2 | 2 |

[1]Cis 1,4-polyisoprene (natural rubber).
[2]N330 type carbon black, an ASTM designation.
[3]Fine particle size hydrated amorphous precipitated silica obtained as granules or pellets from PPG Industries
[4]Composite composed of 50 parts bis(3-triethoxysilylpropyl) disulfide and 50 parts of carbon black
[5]Zinc oxide
[6]Stearic acid, industrial grade
[7]Reactive resin
[8]Dibenzamidodiphenyl disulfide, mineral oil and inert filler
[9]A low viscosity rubber processing oil
[10]Sulfenamide, tetrabenzylthiuram disulfide and diphenylguanidine types
[11]Sulfur
[12]Phenylenediamine types
[13]N-N"-m-phenylenediamaleimide The rubber compositions were cured for about 18 minutes to a temperature of about 150° C. Various physical properties of the rubber compositions, cured and uncured, are shown in the following Table 2.

The terms "MTS" and "UTS" refer to Materials Testing Systems equipment and United Testing Systems equipment, respectively.

TABLE 2

|  | Control Sample A | Sample B |
|---|---|---|
| MTS, Dynamic Modulus | | |
| Tan delta | 0.070 | 0.054 |
| E' (N$^2$/mm) | 6.43 | 5.55 |
| E" (N$^2$/mm) | 0.45 | 0.30 |
| UTS (ASTM D412) | | |
| 300% modulus (N$^2$/mm) | 11.3 | 7.7 |
| Ultimate tensile (N$^2$/mm) | 27.9 | 28 |
| Ultimate elongation (%) | 585 | 665 |
| Goodrich Blowout (ASTM D623) | | |
| Time (min.) | 60 | 60 |
| Temperature (° C.) | 127 | 119 |
| Hot-U Adhesion[1] | | |
| Average (N) nylon | 200 | 196 |
| Average (N) aramide | 179 | 200 |
| Instron Tear[2] | | |
| Average load (N) | 210 | 243 |
| Rheometer 160° C. (ASTM D2084 or D5289) | | |
| T25 (min.) | 3.6 | 3.9 |
| T90 (min.) | 6.3 | 6.2 |
| Maximum torque | 16.4 | 12.6 |
| Final torque | 15 | 13.1 |

[1]Hot-U adhesion means dipped cord samples are embedded in a strip of rubber using a special mold and inserts. The inserts are held in a heater block and cords are pulled from the rubber using a pulley type holder. The force to pull the sample from the rubber is measured.
[2]Instron tear is designed to obtain a measure of interfacial tear on stocks which have been cured using no backing materials.

It is seen from Table 2 that hysteresis properties of Sample B are substantially improved as compared to Control Sample A, namely substantially lower loss modulus E", and correspondingly substantially lower tan delta physical properties (indicative of lower hysteresis), lower blowout temperature (also indicative of lower hysteresis), while ultimate tensile strength, tear resistance, cord adhesion and cure rates substantially maintained.

The reduction in hysteresis is considered herein to be significant in order to reduce internal heat generation produced during dynamic operating conditions involving sudden loads and rotational speed changes experienced by the landing and takeoff conditions of an aircraft.

While certain representative embodiments and details have been shown for the purpose of illustrating the invention, it will be apparent to those skilled in this art that various changes and modifications may be made therein without departing from the spirit or scope of the invention.

What is claimed is:

1. In accordance with this invention a tire, and particularly a tire intended for use as an aircraft tire, is comprised of a circumferential tread and an underlying and supporting carcass for said tread, with a circumferential tread belt positioned between said tread and the crown portion of said carcass, wherein said carcass is comprised of two spaced apart inextensible bead portions and at least one carcass ply extending through said carcass crown portion and connecting said bead portions, and wherein said tread belt is comprised of at least one belt ply comprised of a plurality of spaced apart, individual continuous cords substantially parallel aligned to each other and substantially axially aligned in the circumferential direction of the tread and where said carcass plies are comprised of spaced apart, individual continuous cords substantially parallel aligned to each other and substantially radially aligned in a direction of from one bead portion to the other, wherein said belt and said carcass plies are individually comprised of a multiplicity of cords of at least one synthetic filament and wherein said belt and carcass cords are individually encapsulated with a natural rubber rich rubber composition, wherein said rubber composition is comprised of, based parts by weight per 100 parts by weight rubber (phr) about 80 to about 100 phr of natural cis 1,4-polyisoprene rubber and from zero to about 20 phr of cis 1,4-polybutadiene rubber, and wherein said carcass ply rubber composition is comprised of (A) about 30 to about 60 phr of aggregates of precipitated silica and from one to a maximum of 10 phr of rubber reinforcing carbon black, and (B) a coupling agent for said silica having a moiety reactive with hydroxyl groups contained on the surface of said precipitated silica and another moiety interactive with at least one of said rubbers; and wherein said belt ply rubber composition contains (A) about 30 to about 60 phr of carbon black reinforcement and up to about 10 phr of precipitated silica, or (B) about 30 to about 60 phr of aggregates of precipitated silica and from one to a maximum of 10 phr of rubber reinforcing carbon black, and a coupling agent for said silica having a moiety reactive with hydroxyl groups contained on the surface of said precipitated silica and another moiety interactive with at least one of said rubbers.

2. The tire of claim 1 which contains from 2 to 36 of said carcass plies and at least one on said belt plies.

3. The tire of claim 1 wherein said rubber composition is exclusive of styrene/butadiene rubber and epoxidized natural rubber.

4. The tire of claim 1 wherein said tire is comprised of said carcass plies and at least one of said belt plies, wherein cords said carcass plies and said at least one belt ply are individually composed of aramid filaments and aramid filaments respectively, of nylon filaments and aramid filaments respectively, of aramid filaments and nylon filaments respectively, of nylon filaments and nylon filaments respectively, of aramid filaments and polyester filaments respectively or of polyester filaments and polyester filaments respectively.

5. The tire of claim 1 wherein said rubber composition contains about 5 to about 10 phr of medium vinyl polybutadiene rubber having a vinyl 1,2-content in a range of about 40 to about 60 percent vinyl.

6. The tire of claim 3 wherein said tire is comprised of said carcass plies and at least one of said belt plies, wherein cords said carcass plies and said at least one belt ply are individually composed of aramid filaments and aramid filaments respectively, of nylon filaments and aramid filaments respectively, of aramid filaments and nylon filaments respectively, of nylon filaments and nylon filaments respectively, of aramid filaments and polyester filaments respectively or of polyester filaments and polyester filaments respectively.

7. The tire of claim 3 wherein said rubber composition contains about 5 to about 10 phr of medium vinyl polybutadiene rubber having a vinyl 1,2-content in a range of about 40 to about 60 percent vinyl.

8. The tire of claim 1 wherein said coupling agent is a bis(3-trialkoxysilylalkyl)polysulfide which contains an average of from 2 to 2.6 or from 3.5 to 4 connecting sulfur atoms in its polysulfidic bridge.

9. The tire of claim 1 wherein said coupling agent is a bis(3-trialkoxysilylalkyl)polysulfide which contains an average of from 2 to 2.6 or from 3.5 to 4 connecting sulfur atoms in its polysulfidic bridge.

10. The tire of claim 1 wherein said coupling agent is a bis(3-triethoxysilylpropyl)polysulfide which contains an average of from 2 to 2.6 or from 3.5 to 4 connecting sulfur atoms in its polysulfidic bridge.

11. The tire of claim 3 wherein said coupling agent is a bis(3-triethoxysilylpropyl)polysulfide which contains an average of from 2 to 2.6 or from 3.5 to 4 connecting sulfur atoms in its polysulfidic bridge.

12. The tire of claim 5 wherein said coupling agent is a bis(3-trialkoxysilylalkyl)polysulfide which contains an average of from 2 to 2.6 or from 3.5 to 4 connecting sulfur atoms in its polysulfidic bridge.

13. The tire of claim 6 wherein said coupling agent is a bis(3-trialkoxysilylalkyl)polysulfide which contains an average of from 2 to 2.6 or from 3.5 to 4 connecting sulfur atoms in its polysulfidic bridge.

14. The tire of claim 5 wherein said coupling agent is a bis(3-triethoxysilylpropyl)polysulfide which contains an average of from 2 to 2.6 or from 3.5 to 4 connecting sulfur atoms in its polysulfidic bridge.

15. The tire of claim 6 wherein said coupling agent is a bis(3-triethoxysilylpropyl)polysulfide which contains an average of from 2 to 2.6 or from 3.5 to 4 connecting sulfur atoms in its polysulfidic bridge.

16. The tire of claim 1 wherein said belt ply rubber composition contains from about 30 to about 60 phr of carbon black.

17. The tire of claim 1 wherein said belt ply rubber composition contains about 30 to about 60 phr of aggregates of precipitated silica and from one to a maximum of 10 phr of carbon black and a coupling agent for said silica.

* * * * *